United States Patent [19]

Dunham

[11] 4,070,786
[45] Jan. 31, 1978

[54] FISH RECEIVING HOPPER

[76] Inventor: James M. Dunham, 119 Kaffie Drive, Natchitoches, La. 71457

[21] Appl. No.: 747,496

[22] Filed: Dec. 6, 1976

[51] Int. Cl.² .............................................. A01K 97/04
[52] U.S. Cl. ..................................................... 43/55
[58] Field of Search ................. 43/54.5 R, 55, 56, 57; 220/1 T; 232/44, 47; 193/33, 34

[56] References Cited

U.S. PATENT DOCUMENTS

| 3,618,814 | 11/1971 | Nagroski | 220/1 T |
| 3,980,166 | 9/1976 | de Feudis | 193/34 |
| 4,008,540 | 2/1977 | Brower | 43/55 |

Primary Examiner—Robert Peshock
Assistant Examiner—Robert P. Swiatek
Attorney, Agent, or Firm—John M. Harrison

[57] ABSTRACT

A fish receiving hopper in cooperation with an ice chest, live well or other fish storage container or vessel, which includes a molded shell adapted to fit on the top of the ice chest, live well, or alternative vessel, which shell carries a downwardly extending chute and a cooperating hinged door adapted to open when a fish is tossed onto the chute and slides downwardly by the force of gravity to strike the hinged door. The fish storage hopper may be removably fitted to or hinged to the ice chest, live well, or other fish storage vessel.

12 Claims, 4 Drawing Figures

FISH RECEIVING HOPPER

BACKGROUND OF THE INVENTION

1. Field of the Invention

This invention relates to a new and improved device for gaining access to ice chests, live wells and alternative storage containers in the process of storing fish during fishing outings. More particularly, the invention relates to a fish receiving hopper which is adapted for mounting on an ice chest or live well and which automatically opens to receive a fish responsive to the weight of the fish, and subsequently closes after the fish has moved through the opening in the hopper and into the ice chest or live well. The fish receiving hopper of this invention is simple in construction, easy to operate, and permits the use of comparatively small quantities of ice or cool water to maintain the stored catch in good condition prior to cleaning and refrigerating on a more permanent basis.

2. Description of the Prior Art

Heretofore, the generally accepted method of storing fish while fishing has been to use an ice chest, live well, or alternative container or vessel having a hinged lid with a handle attached thereto to permit the lid to be opened when a fish is to be placed in the ice chest live well, or other container. Accordingly, in a typical situation where one or more fishermen must periodically gain access to the ice chest or live well to store his catch, the fisherman desiring to place his catch in the ice chest or live well must lift the lid and deposit the fish inside the container, or in the case of more than one fisherman, he may call upon the other fisherman to open the lid for insertion of the fish. In addition to the inconvenience caused by the requirement of periodically opening and closing the ice chest or live well lid, such opening allows outside air to circulate inside the ice chest or live well and permits the ice placed therein for cooling purposes to quickly melt, or allows the water which is included therein to rapidly warm to a point where it loses its refrigerating qualities. This problem is, of course, magnified under circumstances where the fishing is good and large numbers of fish are being caught and placed in the ice chest or live well for storage.

Accordingly, it is an object of this invention to provide a device for insertion of fish in an ice chest, live well or alternative storage container or vessel without the necessity of opening the lid of the vessel to effectuate the insertion.

Another object of this invention is to provide a fish receiving hopper which may be sized and designed to removably fit or be hingedly attached to substantially any ice chest, live well or other storage vessel in functional position on top of, and extending into the ice chest, live well or vessel, and which permits fish being tossed into the hopper to move past a hinged door in the hopper and into the interior of the vessel.

Yet another object of this invention is to provide a fish receiving hopper characterized by a chute and a hinged door, which in combination are capable of receiving a fish, allowing the fish to pass down the chute and past the displaced hinged door and into the interior of an ice chest or live well with minimum loss of refrigerated air or water and without the necessity of providing and periodically opening a conventional ice chest or live well lid to insert the fish.

A still further object of the invention is to provide a fish receiving hopper which can be manufactured of sufficient size to fit substantially any conventional ice chest, boat, live well, or alternative fish storage container or vessel, and which can be hinged to the ice chest, live well or alternative vessel, or simply removably placed or fitted on top of the ice chest, live well or alternative vessel, as desired.

Yet another object of the invention is to provide a fish receiving hopper which is adapted for use in conventional ice chests and/or live wells, and which is capable of receiving fish for storage, and ice or cool water for refrigerating the stored fish through the hopper opening without the provision of a conventional ice chest lid.

Another object of the invention is to provide a fish receiving hopper which may be formed of substantially any convenient size and removably fitted to or hingedly mounted on conventional ice chests, live well boxes or alternative fish storage containers or vessels, and which permits both insertion of fish, ice, and/or cool water in a hopper opening defined by a chute and cooperating hinged door, and access to the interior of the vessel in conventional manner by either lifting the hopper off of the container or vessel, or, in the case of a hinged mounting, by raising the hopper on its hinges in conventional fashion.

SUMMARY OF THE INVENTION

These and other objects of the invention are provided in a fish receiving hopper which includes a formed shell adapted to rest on an ice chest, live well, or alternative container or vessel, the lid of which has been removed, which hopper further includes a chute and a cooperating hinged door, which in combination permit insertion of the fish to be stored, as well as ice or cool water for refrigeration purposes, through the hinged door. The hinged door is preferably positioned in substantially vertical configuration and hinged from the top of the shell, and is further preferably fitted with at least one metal tab which is designed to cooperate with at least one magnet positioned at the base of the chute to facilitate closing of the hinged door adjacent the terminus edge of the chute when a fish, ice, or water is not being inserted in the hopper.

BRIEF DESCRIPTION OF THE DRAWINGS

The invention will be better understood in view of the following description presented with reference to the accompanying drawings.

DESCRIPTION OF THE PREFERRED EMBODIMENTS

Figure 1:
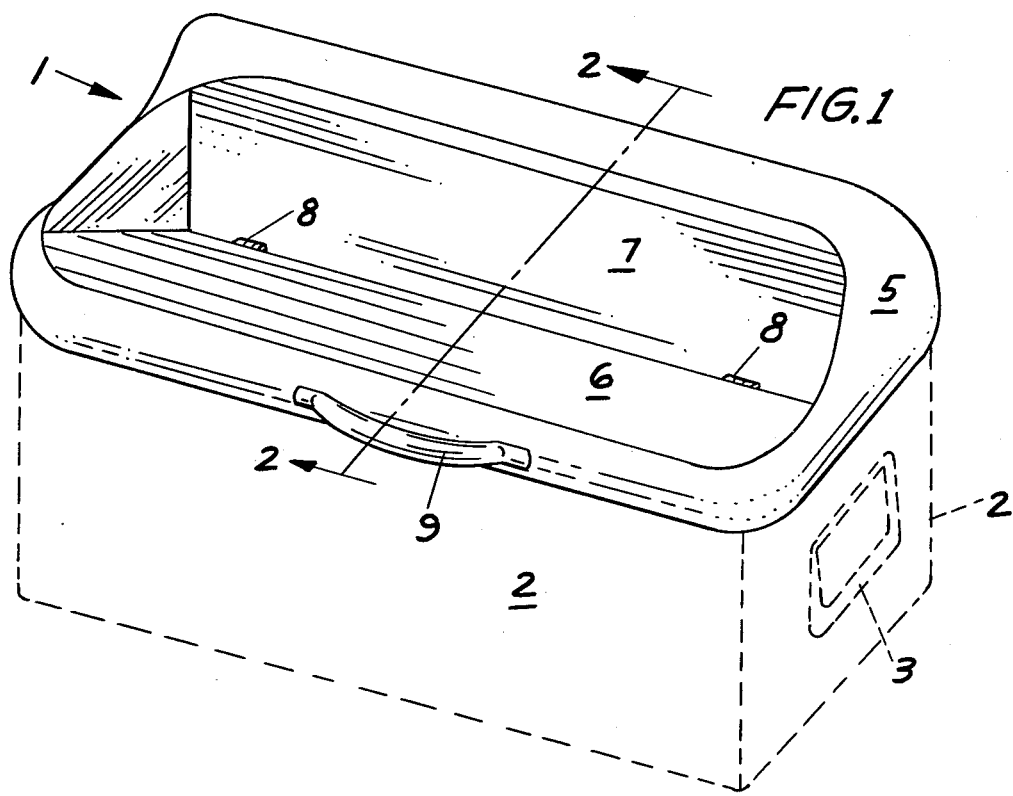
FIG. 1 of the drawing is a perspective view of the fish receiving hopper of this invention illustrated in functional position mounted on a conventional ice chest.
Figure 2:
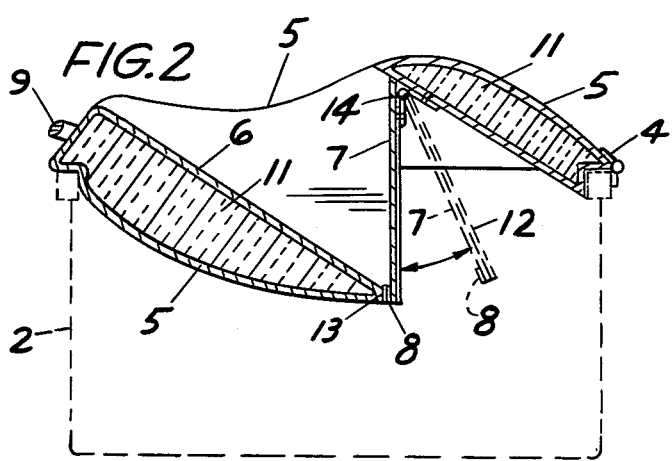
FIG. 2 is a sectional view of the fish receiving hopper illustrated in FIG. 1 taken along lines 2—2 in FIG. 1.
Figure 3:
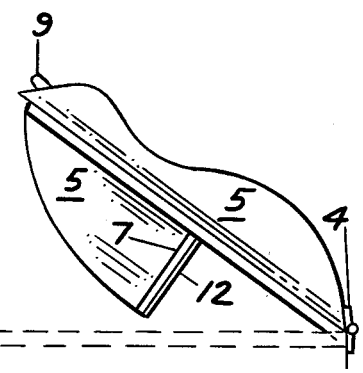
FIG. 3 is a left side elevation of the fish receiving hopper illustrated in FIG. 1 showing the fish receiving hopper in a preferred hinged relationship with the conventional ice chest, and in partially opened configuration.
Figure 4:
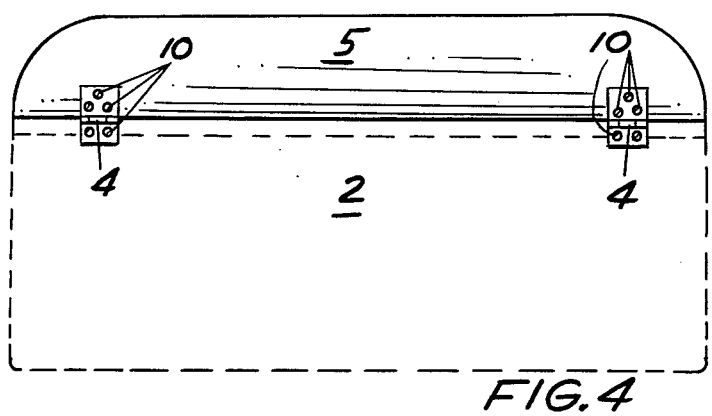
FIG. 4 is a rear elevation of the fish receiving hopper and ice chest illustrated in FIG. 1 with the fish receiving hopper illustrated in closed configuration.

Referring now to FIGS. 1 and 4 of the drawing, the fish receiving hopper of this invention is generally illustrated by reference numeral 1, and is shown in typical operational configuration hingedly mounted on a conventional ice chest 2, illustrated in broken lines. Conventional ice chest 2 is equipped with carrying handles 3 disposed on each side of the chest, and fish receiving hopper 1 hingedly cooperates with conventional ice chest 2 by chest hinges 4, more particularly illustrated in FIGS. 2-4 of the drawing. Fish receiving hopper 1 is characterized by shell 5, which is typically molded of a suitable material such as fiberglass, polystyrene or the like, and fits tightly on top of a lidless conventional ice chest 2 to substantially seal all mating surfaces. Shell 5 carries chute 6, disposed downwardly from the frontal portion of shell 5 at an acute angle, preferably about 45 degrees with respect to the horizontal, as more particularly illustrated in FIG. 2 of the drawing. Hinged door 7 is disposed in substantially vertical, hinged relationship in the interior of shell 5. The bottom edge of hinged door 7 is removably positioned against the bottom or terminus edge of chute 6 by means of door clips 8 mounted to hinged door 7 and registering magnets 13 mounted to the terminus edge of chute 6, as illustrated in FIGS. 1 and 2 of the drawing. Alternative releasable fastening means can be used to removably secure hinged door 7 against the terminus edge of chute 6 according to the knowledge of those skilled in the art, although door clips and magnets are preferred because of the positive, yet releasable lock, and for ease of cleaning. The top edge of hinged door 7 is hinged to the top of shell 5, preferably by means of piano hinge 14, to permit the lower edge of hinged door 7 to swing away from the mating terminus edge of chute 6 and magnets 13, when a fish, ice or a quantity of water is propelled down chute 6, against hinged door 7, and through the opening created between hinged door 7 and the terminus edge of chute 6, into the interior of conventional ice chest 2. After passage of the fish, ice or water down chute 6 and through this opening, the displaced hinged door 7 swings back into position by the action of gravity, as illustrated in FIG. 2, and is again removably secured in position the terminus edge of chute 6 by magnetic attraction between door clips 8 and magnets 13.

In a preferred embodiment of the invention, and referring again to FIG. 2 of the drawing, it is desirable to hang hinged door 7 on piano hinge 14 in a position of at least one, and preferably two or three degrees toward the open position from the vertical. This configuration of hinged door 7 readily facilitates a positive swing back into secure position against the terminus edge of chute 6 after each passage of the fish, ice or water down chute 6 and into conventional ice chest 2 by the action of gravity. It is also preferred to provide a strip of contact sealing material such as a weather seal or stripping on either the edge of hinged door 7 adjacent the terminus edge of chute 6, or on the terminus edge of chute 6 itself, in order to releasably seal the mating surfaces of chute 6 and hinged door 7. Similarly, referring to FIGS. 2 and 3 of the drawing, a layer of door insulation 12 is also preferably fitted to the surface of hinged door 7 facing the interior of conventional ice chest 2 to help insulate the chest. An expanded foam material such as polyurethane or polystyrene can be used for this purpose according to the knowledge of those skilled in the art. The door clips 8 and magnets 13 may be glued or otherwise secured to hinged door 7 and the terminus of chute 6 to facilitate positive and sealing, but removable mating of these surfaces, as heretofore described.

In order to remove the accumulated catch from the interior of conventional ice chest 2 or to view the contents of the chest or to place a larger fish or quantity of ice than is possible to fit through the chute-and-door opening in fish receiving hopper 1, shell 5 can be easily opened on chest hinges 4 by means of hopper handle 9, as illustrated in FIG. 3 of the drawing, to expose the contents and interior of conventional ice chest 2. Chest hinges 4 are typically mounted to conventional ice chest 2 and fish receiving hopper 1 by screws 10, or by alternative means such as brads.

It will be appreciated by those skilled in the art that fish receiving hopper 1 can be formed in various suitable shapes and sizes necessary to be compatible with commercially available ice chests and live wells in boats, as well as alternative containers or vessels, as desired. Such conventional chests can be prepared to receive the fish receiving hopper by simply removing the lid and inserting a hopper of appropriate size over the top; hinges can be added if desired. Furthermore, as illustrated in FIG. 2 of the drawing, shell 5 may be provided with interior insulation 11 as illustrated in order to minimize the amount of heat introduced in the interior of conventional ice chest 2 from the atmosphere. In the alternative, the spaces in shell 5 which are illustrated as packed with insulation 11 can be formed without the insulation to provide dead air spaces for insulation purposes. In this regard, in a preferred embodiment of the invention, it is desirable to manufacture the fish receiving hopper in two parts, dividing shell 5 into an upper and a lower section to facilitate easy molding, according to the knowledge of those skilled in the art. Since fish receiving hopper 1 rarely needs to be lifted on chest hinges 4 except to remove the accumulated catch, and since minimum heat gain is realized by the contents of the chest when a fish, ice, and/or water is placed on chute 6 for introduction into the interior of conventional ice chest 2 because hinged door 7 is open only momentarily during each insertion, the stored fish remain fresh and cool for a longer period of time than in the case of conventional storage containers.

It will be appreciated as heretofore described, that the fish receiving hopper of this invention may be hingedly mounted or otherwise removably positioned on substantially any ice chest, live well or similar fish storage container or vessel; furthermore, the size of the hopper opening, which is essentially the opening defined by hinged door 7 and chute 6, can be varied depending upon whether the fisherman desires to place small or large fish in the storage container, by using a hopper of desired size for the particular storage vessel or container under consideration. For example, in the case of those fishermen who limit their fishing to the taking of relatively small fish such as bream or crappie, the hopper opening defined by hinged door 7 and chute 6 can be made smaller than it would need to be in the case of those fishermen desiring to store bass or larger fish. In like manner, larger storage containers or vessels can be easily fitted with fish receiving hoppers of the design disclosed and claimed herein for receiving and storing large fresh or salt water fish of any description according to the application of this invention.

Having described my invention with the particularity set forth above what is claimed is:

1. A fish receiving hopper for use with a fish storage container comprising a shell-like cover, a downwardly extending chute disposed in the top of said shell-like cover and having a bottom terminus edge, and a substantially vertically oriented door having the top edge hinged to said shell-like cover and the bottom edge normally co-extensive with and adjacent said bottom terminus edge of said chute in closed configuration, whereby when a fish is caused to slide down said chute and contact said door, said door is displaced from said bottom terminus edge and swings open to permit said fish to fall into said storage container and returns to said closed configuration by operation of gravity after passage of said fish.

2. The fish receiving hopper of claim 1 further comprising contact sealing means on said terminus edge of said chute to releasably seal the interface between said terminus edge and said bottom edge of said door which is normally co-extensive with said terminus edge.

3. The fish receiving hopper of claim 1 further comprising cooperating releasable fastening means carried by said terminus edge of said chute and said bottom edge of said door which is normally co-extensive with said terminus edge, to releasably secure said bottom edge of said door to said terminus edge of said chute.

4. The fish receiving hopper of claim 3 wherein said cooperating releasable fastening means is at least one magnet secured to said terminus edge of said chute and at least one door clip in registration with said at least one magnet and secured to said bottom edge of said door which is normally co-extensive with said terminus edge of said chute.

5. The fish receiving hopper of claim 1 further comprising:
   a. contact sealing means on said terminus edge of said chute to releasably seal the interface between said terminus edge and said bottom edge of said door which is normally co-extensive with said terminus edge; and
   b. cooperating releasable fastening means carried by said terminus edge of said chute and said bottom edge of said door which is normally co-extensive with said terminus edge, to releasably secure said bottom edge of said door to said terminus edge of said chute.

6. The fish receiving hopper of claim 1 further comprising a piano hinge joining said top edge of said door to said shell-like cover, and at least one chest hinge joining said shell-like cover to said fish storage container.

7. The fish receiving hopper of claim 1 further comprising:
   a. contact sealing means on said terminus edge of said chute to releasably seal the interface between said terminus edge and said bottom edge of said door which is normally co-extensive with said terminus edge;
   b. at least one magnet secured to said terminus edge of said chute and at least one door clip in registration with said at least one magnet and secured to said bottom edge of said door to releasably secure said bottom edge of said door to said terminus edge of said chute; and
   c. a piano hinge joining said top edge of said door to said shell-like cover, and at least one chest hinge joining said shell-like cover to said fish storage container.

8. The fish receiving hopper of claim 1 further comprising a layer of insulation on said door to minimize heat transfer through said door.

9. The fish receiving hopper of claim 1 further comprising insulation in said shell-like cover to minimize heat transfer through said shell-like cover.

10. The fish receiving hopper of claim 1 further comprising:
    a. contact sealing means on said terminus edge of said chute to releasably seal the interface between said terminus edge and said bottom edge of said door which is normally co-extensive with said terminus edge;
    b. at least one magnet secured to said terminus edge of said chute and at least one door clip in registration with said at least one magnet and secured to said bottom edge of said door to releasably secure said bottom edge of said door to said terminus edge of said chute;
    c. a piano hinge joining said top edge of said door to said shell-like cover, and at least one chest hinge joining said shell-like cover to said fish storage container;
    d. a layer of insulation on said door to minimize heat transfer through said door; and
    e. insulation in said shell-like cover to minimize heat transfer through said shell-like cover.

11. The fish receiving hopper of claim 10 wherein said fish storage container is an ice chest.

12. The fish receiving hopper of claim 10 wherein said fish storage container is a live well.

* * * * *